United States Patent
Fahimian et al.

(10) Patent No.: US 8,532,350 B2
(45) Date of Patent: Sep. 10, 2013

(54) DOSE REDUCTION AND IMAGE ENHANCEMENT IN TOMOGRAPHY THROUGH THE UTILIZATION OF THE OBJECT'S SURROUNDINGS AS DYNAMIC CONSTRAINTS

(75) Inventors: Benjamin Pooya Fahimian, Beverly Hills, CA (US); Jianwei Miao, Manhattan Beach, CA (US)

(73) Assignee: The Regents of the University of California, Oakland, CA (US)

( * ) Notice: Subject to any disclaimer, the term of this patent is extended or adjusted under 35 U.S.C. 154(b) by 520 days.

(21) Appl. No.: 12/840,065

(22) Filed: Jul. 20, 2010

(65) Prior Publication Data

US 2011/0007980 A1  Jan. 13, 2011

Related U.S. Application Data

(63) Continuation of application No. PCT/US2009/032733, filed on Jan. 30, 2009.

(60) Provisional application No. 61/024,762, filed on Jan. 30, 2008.

(51) Int. Cl.
G06K 9/00  (2006.01)

(52) U.S. Cl.
USPC .............................. 382/128; 128/922; 378/4

(58) Field of Classification Search
USPC ............... 382/100, 128, 129, 130, 131, 132, 382/133; 128/922; 378/4–27
See application file for complete search history.

(56) References Cited

U.S. PATENT DOCUMENTS

| 4,506,327 | A | 3/1985 | Tam |
| 4,616,318 | A | 10/1986 | Crawford |
| 4,752,879 | A | 6/1988 | Brunnett |
| 4,888,693 | A | 12/1989 | Tam |
| 5,761,267 | A | 6/1998 | Besson |
| 5,937,102 | A * | 8/1999 | Jin .............................. 382/276 |
| 6,304,317 | B1 | 10/2001 | Taniguchi et al. |
| 6,366,638 | B1 | 4/2002 | Hsieh |
| 6,459,754 | B1 * | 10/2002 | Besson et al. ..................... 378/4 |
| 6,510,241 | B1 * | 1/2003 | Vaillant et al. ............... 382/154 |
| 6,744,848 | B2 | 6/2004 | Stanton et al. |
| 6,862,337 | B2 | 3/2005 | Claus et al. |

(Continued)

FOREIGN PATENT DOCUMENTS

| JP | 2002-263097 | 9/2002 |
| JP | 2006-239003 | 9/2006 |
| WO | 2007026234 A1 | 3/2007 |
| WO | 2008017076 A2 | 2/2008 |

OTHER PUBLICATIONS

WIPO, counterpart PCT Application No. PCT/US2009/032733, International Publication No. WO 2009/097580 dated Aug. 6, 2009, including international search report and written opinion issued on Sep. 1, 2009, pp. 1-40.

(Continued)

*Primary Examiner* — Anand Bhatnagar
(74) *Attorney, Agent, or Firm* — John P. O'Banion

(57) ABSTRACT

Image reconstruction methods are described where the characteristics of the surroundings of the patient in the scanner image field are used as supplemental information in the reconstruction process to reduce the dose, reduce scan times, scan number and/or improve the image quality of the reconstructed image.

20 Claims, 4 Drawing Sheets

(56) References Cited

U.S. PATENT DOCUMENTS

| | | | |
|---|---|---|---|
| 6,873,744 | B2 | 3/2005 | Ottesen |
| 6,920,240 | B2 | 7/2005 | Rodet et al. |
| 7,076,091 | B2 | 7/2006 | Rosenfeld |
| 7,209,535 | B2 * | 4/2007 | Chen et al. .................. 378/4 |
| 7,315,636 | B2 * | 1/2008 | Kuduvalli .................. 382/128 |
| 7,436,507 | B2 | 10/2008 | Moribe |
| 7,439,739 | B2 | 10/2008 | Beatty |
| 7,940,885 | B2 * | 5/2011 | Stanton et al. .................. 378/7 |
| 2003/0095596 | A1 | 5/2003 | Shimizu |
| 2003/0198403 | A1 | 10/2003 | Ottesen |
| 2004/0076257 | A1 | 4/2004 | McDaniel |
| 2004/0215072 | A1 | 10/2004 | Zhu |
| 2005/0135664 | A1 * | 6/2005 | Kaufhold et al. .................. 382/131 |
| 2007/0003122 | A1 | 1/2007 | Sirohey et al. |
| 2007/0053477 | A1 | 3/2007 | Ning |
| 2007/0160304 | A1 | 7/2007 | Berkner |
| 2007/0232890 | A1 | 10/2007 | Hirota |
| 2007/0297660 | A1 * | 12/2007 | Hsieh et al. .................. 382/131 |
| 2009/0232377 | A1 | 9/2009 | Miao et al. |
| 2010/0284596 | A1 | 11/2010 | Miao et al. |

OTHER PUBLICATIONS

WIPO, related PCT Application No. PCT/US2007/075220, International Publication No. WO 2008/017076 dated Feb. 7, 2008, including international search report and written opinion issued on Apr. 10, 2008, pp. 1-65.

State Intellectual Property Office of China, The Notification of First Office Action, issued Jun. 9, 2010, related CN Application No. 200780028681.0, translation including claims examined, pp. 1-18.

Miao, J. et al.—"Three-Dimensional Gan-Ga2O3 Core Shell Structure Revealed by X-Ray Diffraction Microscopy"—Physical Review Letters, 97, 2006, pp. 215503-1-215503-4.

Averbuch, A. et al.—"Fast and accurate Polar Fourier transform"—Appl. Comput. Harmon. Anal. 21, 2006, pp. 145-167.

State Intellectual Property Office of P.R. China, The Notification of the Second Office Action (translation) issued Jun. 15, 2011, related Chinese Patent Application No. 200780028681.0, counterpart to PCT/US2008/075220, with claims examined, pp. 1-16.

Mao, Yu et al.—"Development and Optimization of Regularized Tomographic Reconstruction Algorithms Using Equally-Sloped Tomography"—IEEE Transactions on Image Processing, vol. 19, No. 5, May 2010, pp. 1259-1268.

Korean Intellectual Property Office (KIPO), International Search Report and Written Opinion dated Dec. 16, 2010, including claims searched, related PCT Application No. PCT/US2012/033162, pp. 1-12.

United States Patent and Trademark Office (USPTO), International Search Report and Written Opinion dated Apr. 10, 2008, including claims searched, related PCT Application No. PCT/US2007/075220, pp. 1-21.

Korean Intellectual Property Office (KIPO), International Search Report and Written Opinion dated Feb. 18, 2010, including claims searched, related PCT Application No. PCT/US2009/051290, pp. 1-11.

European Patent Office, Extended European Search Report issued on Oct. 31, 2011, related EPO Patent Application No. 07840699.8, counterpart to PCT/US2007/075220, with claims searched, pp. 1-14.

Delaney, A.H. et al.—"A Fast and Accurate Fourier Algorithm for Iterative Parallel-Beam Tomography"—IEEE Trans. on Image Processing, vol. 5, No. 5, May 1996, pp. 740-753.

Ye, J. et al.—"A Self-Referencing Level-Set Method for Image Reconstruction from Sparse Fourier Samples"—Int. Jour. of Computer Vision, vol. 50, No. 3, 2002, pp. 253-270.

Erlandsson, K. et al.—"A New 3D Backprojection and Filtering Method for PET Using All Detected Events"—IEEE Trans. on Nuclear Science, vol. 45, No. 3, Jun. 1998, pp. 1183-1188.

Olson, T.—"Limited Angle Tomography Via Multiresolution Analysis and Oversampling"—Proc. of the IEEE Time-Frequency and Time-Scale Analysis, Oct. 4, 1992, pp. 215-218.

Australian Government, IP Australia, Examiner's First Report dated Nov. 30, 2011, related AU Application No. 2007281076, counterpart to PCT/US2007/075220, with claims examined, pp. 1-23.

Japanese Patent Office, Notice of Reasons for Refusal (Office Action) issued on Jun. 4, 2013 for corresponding Japanese Patent Application No. 2010-545234, English translation (pp. 1-3), claims examined (pp. 4-8) and original Office Action in Japanese (pp. 9-12) pp. 1-12.

* cited by examiner

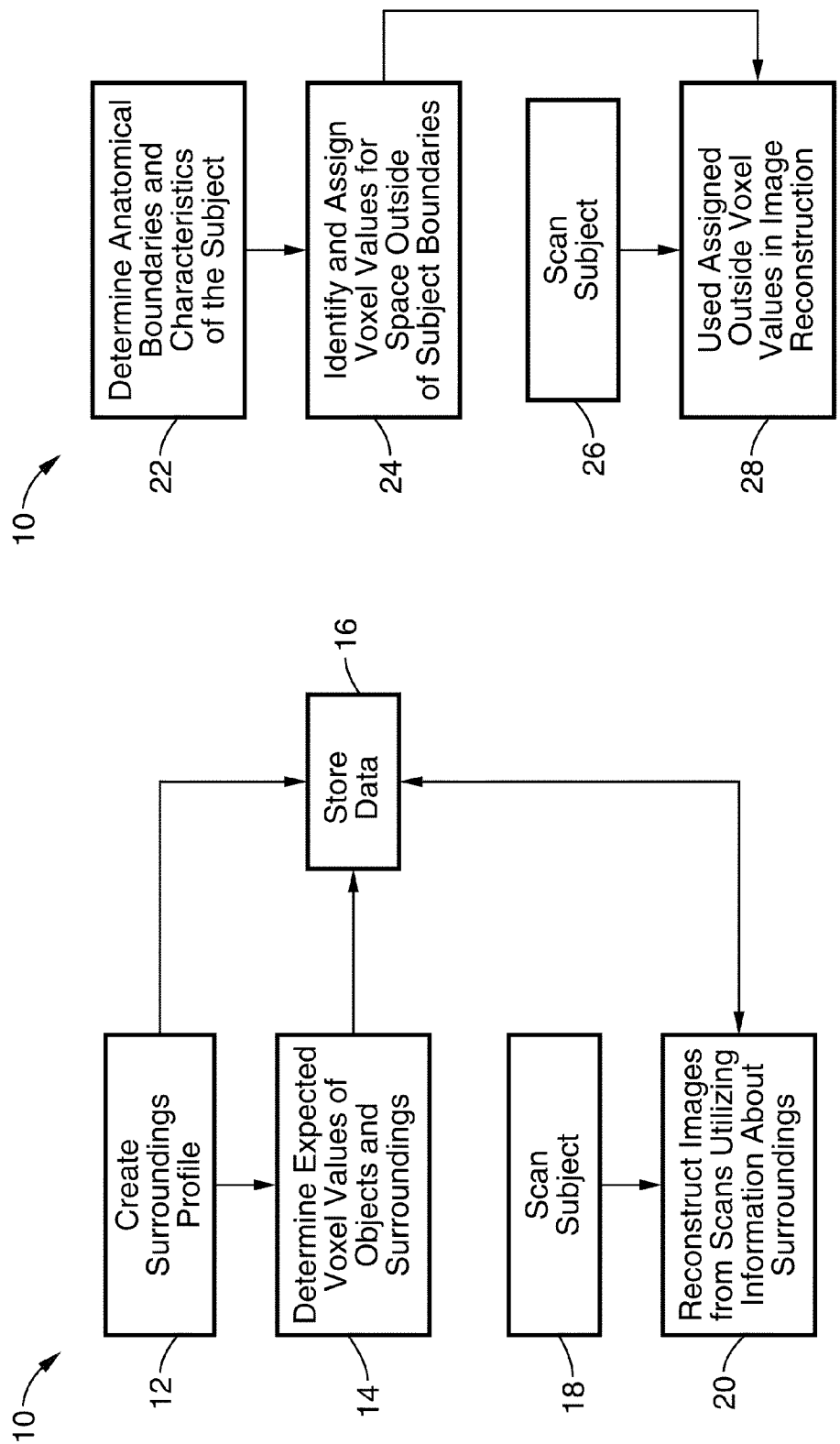

DOSE REDUCTION AND IMAGE ENHANCEMENT IN TOMOGRAPHY THROUGH THE UTILIZATION OF THE OBJECT'S SURROUNDINGS AS DYNAMIC CONSTRAINTS

CROSS-REFERENCE TO RELATED APPLICATIONS

This application claims priority from, and is a 35 U.S.C. §111(a) continuation of, co-pending PCT international application number PCT/US2009/032733 filed on Jan. 30, 2009, incorporated herein by reference in its entirety, which claims priority from U.S. provisional application Ser. No. 61/024,762 filed on Jan. 30, 2008, incorporated herein by reference in its entirety.

This application is related to PCT International Publication No. WO 2009/097580 published on Aug. 6, 2009, incorporated herein by reference in its entirety.

This application is related to U.S. patent application Ser. No. 12/363,079 filed on Jan. 30, 2009 and published on Sep. 17, 2009 as U.S. Patent Application Publication No. US 2009/0232377, incorporated herein by reference in its entirety, which claims priority to PCT international application number PCT/US2007/075220 filed on Aug. 3, 2007 and published on Feb. 7, 2008 as to PCT International Publication No. WO 2008/017076, incorporated herein by reference in its entirety, which claims priority to U.S. provisional application Ser. No. 60/835,552 filed on Aug. 3, 2006.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to tomography, and more particularly to a methodology for using an object's surroundings as a parameter in image reconstruction for the purposes of dose reduction and image enhancement.

2. Description of Related Art

Tomographic imaging systems, such as medical X-ray CT or CAT scanners, produce 2D or 3D images of the internal structures of an object through the mathematical reconstruction of projections taken from many different directions or angles. The typical tomography apparatus, for example, contains a radiation source and a detector that is rotated around an axis extending perpendicularly from the plane of the examination table. Projections of the patient or object are conventionally taken at equal angle intervals such that the angle of the radiating source with respect to the isocenter of the scanner changes by a fixed degree from one projection to the next. The projections are mathematically reconstructed by computers using one of many reconstruction algorithms that have been developed to produce 2D or 3D cross-sectional images of the subject of interest. These algorithms strike a balance between accuracy and the use of computational time and resources. Images have been produced from several different beam sources including x-rays and photons of other energies, electrons, protons, neutrons, sound waves and others.

The image quality of a 2D or 3D image reconstruction from projectional data is strongly dependent on the number of projections that are available. Low contrast structures and the general geometrical fidelity of the reconstruction are lost if the number of projections is below a certain level, which is traditionally quantified by the Nyquist criteria and the Shanon sampling theorem. However, the number of projections that can be obtained is limited by such factors as radiation dose to the patient, practical limitations of the imaging system, and temporal constraints. A critical problem encountered in tomographic imaging is the radiation dose that is imparted to the patient or biological specimen as the result of the imaging procedure. Since the radiation dose is proportional to the number of projections that are taken, and since by its nature tomographic imaging requires a high number of projections for a suitable reconstruction, common procedures such x-ray CT impart a significant radiation dose to patients results in a potential for carcinogenesis as a result of the imaging procedure. Furthermore, with the increasing popularity of medical x-ray CT and fluoroscopic imaging procedures, the long term effects of exposing patients to such ionizing radiation has become an increasing concern, especially for pediatric patients.

The image reconstruction process is analogous to solving a linear system of equations with the unknowns being the voxel values and the equations being the projections through the patient at different positions and angles. The higher the number of unknown voxels, the higher the number of projections that are needed to produce an image of a suitable quality. Conventional tomographic imaging systems in clinical use today use computer programs that typically solve for the entire set of voxel values in the whole volume of the field of view of the scanner including regions of the object's surroundings such as the bed, surrounding air, and surrounding modules.

Current commercial clinical reconstruction algorithms do not use the patient's/object's surroundings in the reconstruction process as it is not obvious how to determine such information about the surroundings for each specific scan setting or how to use this information in the reconstruction process. Furthermore, there exists considerable variation in patient size and shape and positioning of scanner modules as a function of slice location and scan parameters. As a result of reconstructing the full field of view and not utilizing the surrounding information, conventional methods require a high number of projections to reconstruct an object to a satisfactory level of quality. Since the number of projections is related to the radiation dose to the object, such methods lead to higher patient/object doses than is desired.

There is a need for a system and method for tomographic imaging that limits the exposure of the subject to potentially harmful or destructive radiation that is at the same time accurate, reliable and computationally practical. The present methods satisfy these needs, as well as others, and are generally an improvement over the art.

BRIEF SUMMARY OF THE INVENTION

The medical imaging community is a growing multi-billion dollar industry. There is a great need for methods with higher resolution and image quality. Furthermore, with the rapid growth in the popularity of x-ray CT and Fluoroscopic procedures, there is great concern about the radiation dose that is imparted onto patients since radiation is a carcinogenic agent. This invention provides a method for significantly reducing the radiation dose in diagnostic and interventional medical imaging procedures. In addition, this invention provides methods for scan time reduction which is important in applications using high speed imaging of organs such as the heart.

The present invention provides a system and method for use with any tomographic imaging system that reconstructs an object from its projections. By way of example, and not of limitation, some embodiments of the present invention provide methods for reducing the radiation dose that is imparted to patients in tomographic imaging systems, as well as methods for image enhancement (i.e. enhancement of image quality parameters such as resolution, contrast, signal to noise ratio) and scan acquisition time reduction through use of the patient's surroundings as supplemental information in the image reconstruction process. A primary application of these methods is for radiation dose reduction in medical X-ray Computed Tomography (CT/CAT) scanners. However, the methods can be applied to any tomographic imaging system such as variants of transmission CT (Fluoroscopy, Electron Tomography/Microscopy, Megavoltage CT, MicroCT, Proton CT) and variants of emission tomography (Positron Emission Tomography (PET), Single Photon Emission Computed Tomography (SPECT)) as well as other modalities such as ultrasound.

Current tomographic imaging scanner algorithms reconstruct all objects with in the field of view of the scanner and do not fully use dynamic information about the patient's surroundings such as the bed, scanner modules, artificially placed modules, and the dynamically changing air (or gas) volume around the patient to aid in the reconstruction process. One reason that such information is not currently utilized is that it is not obvious how to dynamically determine the patient surroundings since the voxel values are dependent on the imaging modality and the specific beam parameters for the individual scan. Furthermore, it is not obvious how this information can be utilized by reconstruction algorithms in an effective manner.

The present invention provides a method for image reconstruction that accounts for the surroundings of the patient as supplemental information in the reconstruction process to reduce the dose as well as improve the image quality of the reconstructed image and conserve computational resources. Since the number of projections is proportional to patient dose and/or scan time in such systems as transmission computed tomography, dose reduction and/or decreased scan time can be achieved through the use of the present invention.

According to another aspect of the invention, a method is provided to dynamically determine the patient's/object's surroundings and then use the patient's/object's surroundings to aid the reconstruction process.

Another aspect of the invention is to provide a method of dose reduction.

Another aspect of the invention is to provide for image enhancement.

Another aspect of the invention is to provide for increased scan speeds by reducing the number of projections or flux needed for a given image quality.

In another aspect of the invention, a method that determines the expected values of the patient surroundings and utilizes these values to aid in the reconstruction process.

Since the number of projections is proportional to patient dose and/or scan time in such systems as transmission computed tomography, dose reduction and/or decreased scan time can be achieved through the use of the present invention. It will further be appreciated that all of the methods described herein can be used in any computerized tomographic imaging system including, but not limited to, all forms of transmission CT (x-ray CT, fluoroscopy, electron microscopy, etc.) and all forms of emission CT (SPECT, PET, etc.) In one embodiment, the boundaries of the patient are identified using anatomical information that is obtained from another imaging modality, such as MRI or x-ray CT scan.

According to another aspect of the invention, one method is provided comprising the steps of: (a) determining the regions in the field of view that do not correspond to the patient and/or radioactive sources for each slice of the reconstruction, and then (b) utilizing this information by such methods as pushing the voxel values in these regions to values corresponding to the proper value of the gas surrounding the patient or zero activity.

In a further aspect of the invention, a method is provided comprising: (a) utilizing anatomical information from another imaging modality, such as optical, infrared, laser, radiofrequency, x-ray, gamma-ray, patient tracking systems in the art, magnetic resonance, and other imaging systems utilizing other radiation beams, as well as physical measurements, to locate the boundaries of the patient, (b) determining the locations of voxels outside the patient and any known radioactive source, (c) assigning to these locations an expected value corresponding to zero activity, and (d) using the assigned values to aid in the final reconstruction. Alternatively, instead of assigning values corresponding to zero activity to regions defined by step (b), random values close to that corresponding to zero activity can be assigned to the location. Furthermore, the anatomical information can be found by (a) using the same system as in the case for PET/CT, PET/MRI, SPECT/CT, SPECT/MRI systems, (b) co-registering an image from a separate imaging system, (c) physical measurement of the patient, or (d) through visual imaging methods.

According to another embodiment of the invention, one embodiment of the method of reconstructing an image of the patient from the scan utilizing supplemental information about the locations and expected voxel values of the objects of interest involves the utilization of iterative reconstruction algorithms. In some or all iterations of the reconstruction algorithm, the voxel values of the objects of interest, referred as the surroundings regions, are mathematically transformed so that the majority of the voxel values after said transformation are numerically closer (as defined by the absolute value of the difference of the transformed and untransformed voxels) to the said assigned expected voxel values. The iterative reconstruction algorithm can include the algebraic reconstruction technique (ART) and its variants, expectation maximization (EM) and its variants, maximum a posteriori (MAP) and its variants, Maximum Likelihood-Expectation Maximization (ML-EM), iterative filtered back projection methods, iterative forward- and back-projection methods, direct iterative Fourier methods, and their ordered subsets. However, the equally sloped tomography method is preferred.

Another embodiment according to the invention provides a mathematical transformation for a given voxel location that is the weighted sum of the terms as defined by a scalar multiplied by the assigned expected voxel value plus another scalar multiplied by the current voxel value plus another scalar multiplied by the previous voxel value plus other scalars multiplied by other past voxel values when the voxel value at the given iteration stage differs from the expected voxel value by a certain user defined percentage; the scalars are generally independent and may be negative, zero, or positive.

In another embodiment, where the mathematical transformation for a given voxel location is the replacement of the voxel value at the given iteration stage with that of the expected voxel value when the voxel value at the given iteration stage differs from the expected voxel value by a certain user defined percentage. In another embodiment, the mathematical transformation for a given voxel location is the weighted sum of the terms with some of the terms being the geometric mean of the expect voxel value one or several past and present voxel value when the voxel value at the given iteration stage differs from the expected voxel value by a certain user defined percentage.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only:

FIG. 1 is a flow diagram of a method for dose reduction and image enhancement using the subjects surrounding according to one embodiment of the invention.

FIG. 2 is a flow diagram of a method for dose reduction and image enhancement using the subjects surrounding according to an alternative embodiment of the invention.

DETAILED DESCRIPTION OF THE INVENTION

Figure 3:
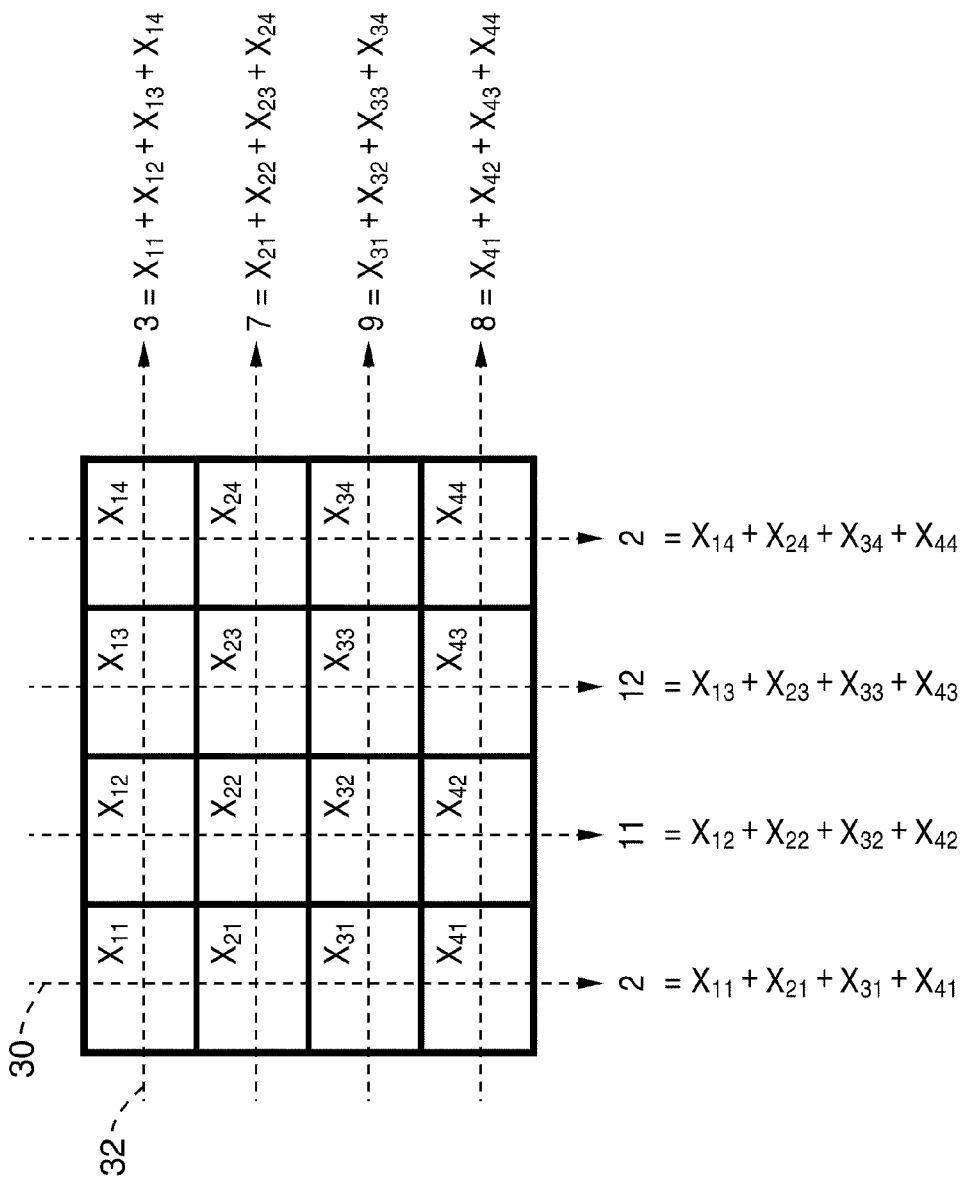
FIG. 3 depicts the image from a tomographic imaging modality as a set of voxels with unknown values.

Referring more specifically to the drawings, for illustrative purposes the present invention is embodied in the methods generally shown in FIG. 1 through FIG. 5B and the associated devices used to perform the methods. It will be appreciated that the apparatus may vary as to configuration and as to details of the parts, and that the method may vary as to the specific steps and sequence, without departing from the basic concepts as disclosed herein.

The present invention relates to improved computed tomographic imaging systems that mathematically reconstruct a cross section of an object from its projections. The number of projections and the exposure of a subject to ionizing radiation such as X-rays can be reduced by determining the expected values of the patient surroundings and utilizing these values to aid in the reconstruction process.

The term "patient" is used herein to denote any desired object that is being imaged and may be human, animal, or inanimate. The term "subject" is used to denote any patient, animal, or inanimate object placed in the selected scanner. The terms "voxel" and "pixel" are also used interchangeably.

Turning now to FIG. 1, one embodiment of the invention for use with scans such as transmission CT scans is shown as an illustration. At block 12 of FIG. 1, a profile of the scanner subject surroundings is created. This profile will account for the type of scanner, scan parameters and the characteristics of the subject that is being scanned. For example, conventional scanners may have one of several different types of beam sources including photons, electrons, protons, ions, neutrons and sound waves.

In addition, voxel values of a reconstruction are dependent on many factors including the energy spectrum of the radiation beam, the filtration of the beam, the scan parameters, the physical behavior of the beam that has been transmitted through an object, the imaging modality, and pre or post processing of the data. For example, in x-ray CT, the voxel values of the reconstructed image (before being transformed into Hounsfield units), represent the attenuation coefficient of the material at that voxel location. This attenuation coefficient is dependent on the energy spectrum of the source. A complicating factor is that the spectrum of the radiation field is varied for different protocols for a given imaging system. For example, in x-ray CT, the voltage of the x-ray tube is routinely changed (by adjusting the kVp parameter for example) which in turn changes the mean energy and the shape of the energy spectrum of the source. Additionally, filters such as slabs of aluminum can be added to change the spectrum. Furthermore, the spectrum of radiation going through objects may be convoluted by scatter.

The typical scanner will also attempt to resolve the whole field of view of the scanner including the background surroundings of the subject such as the bed, the surrounding air volume and support modules. This process creates the need for a higher number of projections for an adequate reconstruction than Here instead, the characteristics of the scanner and the surroundings are identified and categorized and located in three dimensional space in the embodiment shown for some or all possible scan protocols and scanner configurations. This profile information may be stored in data storage at Block 16 for access and use with computer tomography programming.

At Block 14, the expected voxel values of the objects and surroundings of the subject are determined. Generally, the expected voxel values corresponding to the patient's surroundings are determined for the specific imaging system and scan protocol and then those values are utilized to aid in the image reconstruction process. These values can be determined by several different methods.

In one preferred embodiment, the expected voxel values of the patient's surroundings at Block 14 are determined by performing a set of scans without the patient in the scanner using many different scan parameters and scanner configurations in order to produce a reference data set with the approximate voxel values for each type of scan and scanner configuration. During the reconstruction process, the locations and nature of the patient's surroundings are determined by an initial reconstruction, a set of voxels is designated as constraints, the expected values of these designated voxels are determined from the reference scans, and these expected values are then utilized to aid in the reconstruction at Block 20 of the subject scan at Block 18.

It is preferred that the acquired scans of the individual scanner without the patient in the scanner will use settings that result in the same approximate source spectrum shape (preferably normalized to be independent of fluence) as the subsequent patient scans at Block 18. The number of projections, the fluence of the source, and acquisition time can vary from the corresponding patient scan at Block 18, however. In most situations it is desirable for the preliminary scan without the subject to be of the highest quality and therefore more projections and fluence may be used. After the desired processing (such as beam hardening and scatter correction) and reconstruction, the reconstructed images of the scanner are stored at Block 16. It will be appreciated that this method can be repeated for all or a partial set of all possible source settings, for all or a partial set of all possible "scanner bed"

configurations, or for all or a partial set of all possible configurations of all types of additional scanner modules.

In another embodiment, physical modeling and knowledge of the nature of the patient's surroundings are used to determine the approximate voxel values of designated regions at Block 14. For example, from an initial reconstruction of a preliminary scan, the locations of voxels corresponding to the patient's surroundings are determined, and, using knowledge of the scan settings and the imaging modality, the expected voxel values of the designated surroundings can be determined theoretically based on physical principles. For example, in a medical x-ray CT/CAT scan, the values of the voxels are known to correspond to the attenuation coefficient of the objects in the voxels for the specific scan parameters. Then, for example, through the knowledge of the composition of the gas surrounding the patient (i.e. air), the attenuation coefficient of the air can be determined from published values of the attenuation coefficient of the air for the specific beam energy and spectrum. These values can then be utilized in an iterative reconstruction algorithm to push the reconstructed values towards the known values. In another example, the knowledge of the composition of the patient bed can be used in a similar manner. Alternative methods include physical modeling through computer simulations such as Monte Carlo techniques.

In a further embodiment, the determination of the locations of the surroundings of the subject at Block 12 and voxel values at Block 14 can be conducted through other methods besides producing an initial scan of the subject or the scanning bed configuration without the subject. For example, the location of the borders of the patient and the surroundings can be determined through physical measurement to designate the presence of the subject in only a certain part of the scanner field. Then in the reconstructions, the locations of parts outside of the patient (such as the surrounding air) can be estimated to be in certain regions covered by a set of voxels. At these locations, the expected values of the voxels can be utilized in the reconstruction process at Block 20.

Alternatively, the boundaries of the subject and the surrounding locations can be determined through the use of visual pictures, video monitoring of the patient, and many other patient motion tracking systems that exists in the art in the scanner at Block 12 and then the voxel values of the surroundings can be assigned at Block 14. Illustrative patient tracking systems include common apparatus in such fields as radiation therapy for patient localization and monitoring such as lasers, emitting or reflecting radiation sensors such as infrared (Synchrony) and radiofrequency (Calypso) placed on locations of interest on the patient, respiratory tracking systems, and radioactive seeds placed on or inside the patient. Such tracking systems may also be utilized to track locations of scanner modules or artificially introduced modules.

The information gained from any such existing or future patient monitoring systems to locate the boundaries and location of the patient and or modules can also be used at Block 12 and Block 14 and stored at Block 16. This information can then be used to locate the borders of the patient and the surroundings to designate the presence of the subject in only a certain part of the scanner field and modules and surroundings in other parts. Using this profile, the patient can be determined to be in a region P representing a set of voxels in the digital reconstructed image, and the surrounding modules and air for example can be determined to be in a set of voxels representing the union of such subject surrounding regions and denoted by the equation:

$$S = S_{Module\ 1} \cup S_{Module\ 2} \ldots \cup S_{Module\ n} \cup S_{Air}.$$

Through the use of iterative reconstruction algorithms, the expected values of the surroundings derived from various embodiments of the invention are incorporated into the algorithm as discussed below. The incorporation of this type of information regarding the surroundings will reduce the number of unknowns in the tomographic reconstruction problem, and will allow for reconstructions using fewer numbers of projections or enhanced image quality. Accordingly, instead of acquiring a full set of projections, a fewer number of projections may be acquired as the missing data solved for is reduced through using the knowledge gained by the incorporation of the surrounding information. Consequently, since the radiation dose imparted to patients is proportional to the number of projections acquired, the total dose of radiation is reduced using one embodiment of this invention.

In another embodiment, the regions of the patient P and the surroundings S are determined by the user or computer through the use of a preliminary reconstruction of the available data from the scan of the patient. For example, using the projections acquired with the patient in the scanner at Block 18, a preliminary reconstruction is produced using one of the existing reconstruction algorithms such as Filtered Back Projection (FBP). Then in one embodiment, through visual inspection of the said preliminary reconstruction and or aid of computer algorithms, the user designates the P and S regions. Computer algorithms that can aid in this process include a host of thresholding and segmentation algorithms present in the art that can distinguish boundaries between objects in a digital image through analysis of the variation of voxel values. Such algorithms may also be used to automatically detect the background or patient regions without user input.

For example, in one embodiment the computer determines from transmitted signals from the scanner or user that the patient bed exists below a certain level, or is located in a certain location in the reconstructed image and there are no other modules besides the bed in the field of view. It is also known that voxel values corresponding to the air surrounding the patient must be below some threshold value based on theoretical and physical considerations. The region corresponding to the patient can then be found by a simple "find" command that searches for voxels with a value that is a certain defined percentage above that expected of the air with the exception of regions that are known to be bed or modules. The result of this find function will represent the region P and the surroundings S are determined to be regions of voxels other than P. Once this is known, the expected values as determined by other parts of this invention can be utilized in these regions as described. It is also appreciated, that the information gained from this embodiment can be combined with information from other embodiments described here such as information from patient tracking systems.

As illustrated in the embodiment of FIG. 1, the method can be used to locate the desired object of interest (bed, modules, gas volume, etc.) and store the voxel values for all or a partial set of all possible planar locations, axial locations, source parameters, module configurations, and scan protocols at Block 16. The method can further be used to extract the expected shape of the scanner modules as a function of planar location, axial location, source parameters, and module configuration. The scan can also be performed with an object in the scanner to model the changes to imaging systems (defined as any part or by product of the scanner such as the beam, modules, surroundings, etc.) when the patient is in the scanner. The object may for example be a patient equivalent phantom. Modules can be purposefully added and scanned using a preliminary scan and these additional modules can then be added to the patient scan.

The information from the shape and location of the scanner modules can also be used to attach approximate theoretical values to module regions. Theoretical values can be derived from calculations, tables, equations, or simulations.

It will also be appreciated that in certain situations the presence of the patient in the scanner causes deformations in the modules, or the shape of the object of interest does not correspond to the original shape in the absence of the patient. Accordingly, in one embodiment, the locations of the reconstructed patient image are kept and approximate or interpolated values from any the above described methods are used.

Additionally, in one embodiment of the invention, modules that are attached (for the purposes of the scan) to the patient such as clamps, head braces, immobilization units are utilized and identified and voxel values assigned at Block 14 in the same manner as described above for the scanner modules. The expected values can be based on theoretical values, or from specific scans as described above on an identical or equivalent module.

The scanner profile and expected voxel value determination and other information may be stored at Block 16 for further utilization in the processing of the subject scans at Block 18 and the reconstruction at Block 20. The storage device is preferably a computer with any type of storage media that is configured to receive scan results from a scanner directly or through the transfer of media and has programming that can reconstruct scan images utilizing the derived profile and voxel information as indicated at Block 20.

Referring now to FIG. 18, a scan of the subject patient is taken. The scans at Block 18 are preferably conducted at the same settings as the preliminary scans with the empty scanner so that the scan acquisition conditions are approximately the same. Although the sequence of activities indicated in FIG. 1 is preferred, the scan of the subject can also be at a different point in the sequence of events than shown in the illustration. For example, in one embodiment, the method comprises: (a) scanning the patient, (b) reconstructing the image from the scan, (c) determining the locations of the objects of interest surrounding the patient, (d) determining, using methods of the present invention, the expected values of the objects of interest, and (e) utilizing the information about the locations and expected values of these objects of interest in the reconstruction process.

At Block 20, the scans of the subject that are taken at Block 18 are reconstructed at Block 20 utilizing the information about the area surrounding the subject and the scanner that has been gathered. The introduction of known voxel values of patient surroundings can be utilized by many reconstruction algorithms to solve for the image more accurately and to decrease the number of projections needed to achieve a certain image quality. However, the profile, voxel and other information can be incorporated most easily by iterative reconstruction algorithms. The use of iterative algorithms described below is not required but is used as an illustration of one embodiment of the method.

In general, most iterative algorithms can be reduced to the following process: given $x_i^{(n)}$, the value of voxel i at the nth iteration, the iterative algorithm then produces a new set of voxel values denoted by $x_i^{(n+1)}$ through the use of $x_i^{(n)}$ in some form. This can be written in simplified mathematical terms as $x_i^{(n+1)} = T(x_i^{(n)})$ where T symbolizes all operations and additional inputs of the iterative algorithm which lead to the transformation of $x_i^{(n)}$ into $x_i^{(n+1)}$.

A large class of iterative algorithms such as algebraic reconstruction technique (ART) and its variants, expectation maximization (EM) and its variants, maximum a posteriori (MAP) and its variants, Maximum Likelihood-Expectation Maximization (ML-EM), iterative filtered back projection methods, iterative forward- and back-projection methods, direct iterative Fourier methods, and their ordered subset of variants can be described by the above equation.

To illustrate the methodology of the present invention, let P denote the patient region and S the region surrounding the patient, then a general method for incorporating the surrounding information to any iterative algorithm of the above type is $$x_i^{(n+1)} = \begin{cases} T(x_i^{(n)}) & \text{if } i \in P \\ T(H_{i,n}(x_i^{(n)}, x_i^{expected}, x_i^{(n')})) & \text{if } i \in S \end{cases}$$

where $H_{i,n}$ symbolizes the set operations of the present invention that make the values of the voxel values in the patient's surroundings conform with their expected values that were previously determined or assigned. The term $x_i^{expected}$ denotes the expected values that were determined at Block 14. The subscripts i and n indicate that $H_{i,n}$ can be both a function of voxel position and iteration number. The term $H_{i,n}$ can also be implemented in different ways. The present invention can be expressed in general terms as the utilization of $H_{i,n}$ and use of some or all of $x_i^{expected}$ for the purpose of driving some or all of the voxel values in the surrounding region of the subject towards the expected values. In the simplest implementation, the function $H_{i,n}$ replaces the calculated values in the surrounding region S in the nth iteration by its expected value $x_i^{expected}$. Additionally, the present invention includes an embodiment where the order of $H_{i,n}$ and T are interchangeable in the surrounding region as follows:

$$x_i^{(n+1)} = \begin{cases} T(x_i^{(n)}) & \text{if } i \in P \\ H_{i,n}(T(x_i^{(n)}), x_i^{expected}, x_i^{(n')}) & \text{if } i \in S \end{cases}$$

Furthermore, in a related embodiment, all of the mathematical transformations may be employed with the additional condition that such transformations are only applied to a given pixel location when the voxel value at the given iteration stage differs from the expected voxel value by a certain user defined percentage.

In another embodiment, the calculated value is only replaced by the expected value if the calculated value is not within a certain percentage of the expected values. In other embodiments, $H_{i,n}$ "pushes" the calculated values towards the expected values in each iteration. One such equation provides:

$$H_{i,n}(x_i^{(n)}) = \alpha x_i^{(n)} + \beta x_i^{(n')} \gamma x_i^{expected}$$

where $\alpha$, $\beta$, $\gamma$ are normalized constants. For example, if $\alpha=0$, $\beta=0$, $\gamma=1$, the algorithm replaces the surrounding voxels with their expected values. Likewise, if $\alpha=0.1$, $\beta=0$, $\gamma=(1-\alpha)=.9$ or $\alpha=0$, $\beta=0.1$, $\gamma=(1-\beta)=0.9$ the values are 'pushed' in towards the value of the expected values. Multiplicative modifications are also possible such as $$H_{i,n}(x_i^{(n)}) = \alpha\sqrt{x_i^{(n)} x_i^{expected}} + \beta\sqrt{x_i^{(n')} x_i^{expected}} + \gamma\sqrt[3]{x_i^{(n)} x_i^{(n')} x_i^{expected}} + \ldots$$

or in more general terms $$H_{i,n}(x_i^{(n)}, x_i^{expected}, x_i^{(n')}) = F_{i,n}(x_i^{(n)}, x_i^{expected}, x_i^{(n')}) x_i^{expected}$$

where $F_{i,n}$ is a general function that when multiplied by $x_i^{expected}$ that in general results in a value closer to $x_i^{expected}$ than the calculated value. These conditions can be applied differently to different voxels as well as not being applied during certain iterations. This process forces the final image to be compliant with the accurately known expected values and helps solves for the remaining voxel values by reducing the number of unknowns.

Turning now to FIG. 2, an alternative embodiment of the invention is illustrated for use with emission type settings such as with emission CT scans. In emission tomographic imaging systems (such as Single Photon Emission Computed Tomography (SPECT) and Positron Emission Tomography (PET), and their variants), the radiation source typically lies within the patient and the voxel values are related to the activity that is perceived to emanate from that location. If no activity is present in a certain region surrounding the patient, then the voxel value is expected to be zero or have some offset. The application of the use of such information in the image reconstruction process is complicated by the fact that the anatomical boundaries are not clearly visible in such imaging modalities.

Accordingly, one embodiment of the method comprises (a) utilizing a preliminary scan or other imaging technique to locate the boundaries of the patient, (b) determining the locations of voxels outside the patient and any known radioactive source, (c) assigning to these locations an expected value corresponding to zero activity, and (d) using the assigned values to aid in the final reconstruction of a scanned subject. Alternatively, instead of assigning values corresponding to zero activity to regions defined by step (b), random values close to that corresponding to zero activity can be assigned to the location.

At Block 22 of FIG. 2, the anatomical features and characteristics of the subject to be scanned are determined so that the regions in the field of view of the scanner that do not correspond to the patient and/or radioactive sources for each slice of the reconstruction can be identified. For example, the anatomical information can be found by (a) using the same system as in the case for PET/CT, PET/MRI, SPECT/CT, SPECT/MRI systems, (b) co-registering an image from a separate imaging system, (c) physical measurement of the patient, or (d) through visual imaging methods.

Voxel values are identified and assigned for the space outside of the derived subject boundaries at Block 24. For example, areas corresponding to zero activity can be assigned an expected value and those values can be used in the reconstruction at Block 28 of a subject scan at Block 26. In one embodiment, the methods push the voxel values in the regions identified as "outside" to values corresponding to zero activity.

At Block 28, the information identified at Block 22 and assigned at Block 24 is utilized in the reconstruction of the image from the scan at Block 26. The image reconstruction is similar to that described at Block 20 of FIG. 1.

From the foregoing, it can be seen that the invention provides for achieving dose reduction in tomographic imaging systems by reducing the number of projections needed to achieve a reconstructed image of desired image quality. Such reduction in the number of projections will directly reduce the dose applied to the patient for the scan. In one mode, these methods can be used to achieve a reconstructed image of desired image quality using a lower radiation fluence in emitted or transmitted by a source or multiple sources. Such reduction in the fluence will directly reduce the dose for the scan. In another mode, these methods can be used to improve a given image quality parameter (such as resolution, contrast, signal to noise ratio).

Furthermore, these methods allow the scan time to be reduced by reducing the number of projections. Since the acquisition of each projection requires time, such reduction in the number of projections will directly reduce the total scan time for many imaging systems. Still further, these methods allow the scan time to be reduced by reducing the total source flux. Since in general it takes longer for a source to produce a higher flux, such reduction in the total flux will directly reduce the total scan time for many imaging systems.

The invention may be better understood with reference to the accompanying examples, which are intended for purposes of illustration only and should not be construed as in any sense limiting the scope of the present invention as defined in the claims appended hereto.

Example 1

In order to demonstrate the general principles behind using the patient's surroundings in tomographic scan reconstruction, a simple set of voxels is used. Referring to FIG. 3, the image from a typical tomographic imaging modality is depicted as a set of 16 voxels with unknown values. The dashed arrows 30 and 32 in each row and column represent the vertical and horizontal projections respectively that are acquired experimentally. The projections 30, 32 in many modalities can be considered mathematically as a Radon transform, or a mathematical sum of the translated voxel. The image reconstruction process can then be considered as solving for the 16 voxels through the eight equations provided by the projections as illustrated in FIG. 3.

Mathematically it is not possible to solve for these 16 voxels with just eight equations, hence more equations relating the voxels, i.e. projections, are needed to solve the system. The number of projections must be increased resulting in a higher radiation dose to the patient and longer scan times.

Figure 4:
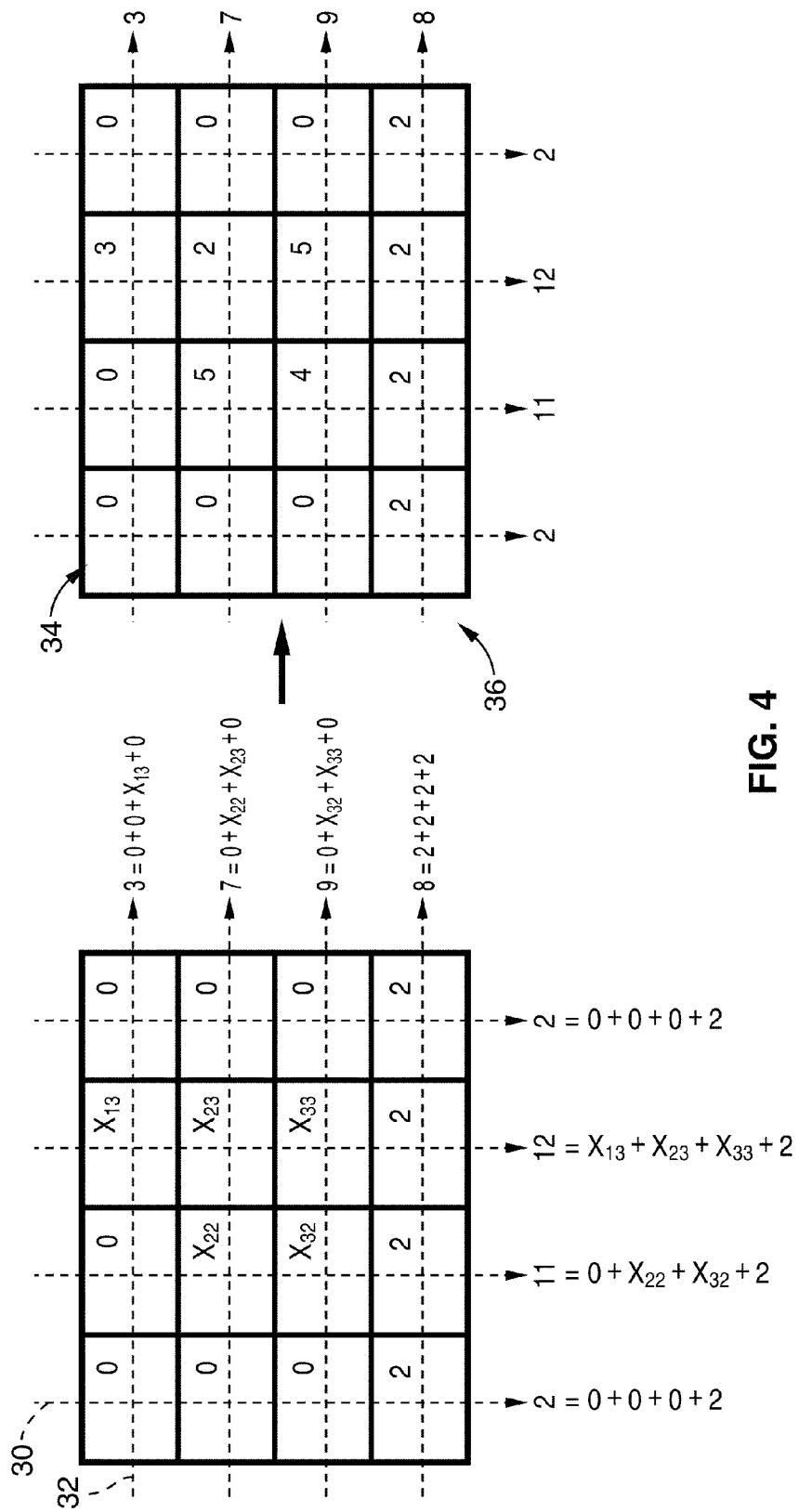
FIG. 4 depicts an image reconstruction solution where information is known about the patient's surroundings according to the invention.

However, as shown in FIG. 4, if some information is known about the patients surroundings, such as the surrounding air 34 (depicted by zeroes in the first 3 rows), and the patient's bed 36 (depicted by "2"s in the fourth row), the system can be solved with just the information from the original two projections. This demonstrates that through the present invention, an object can be reconstructed with a reduced number of projections (hence in general, a reduced patient dose, and scan time) than with conventional methods.

Example 2

Figure 5B:
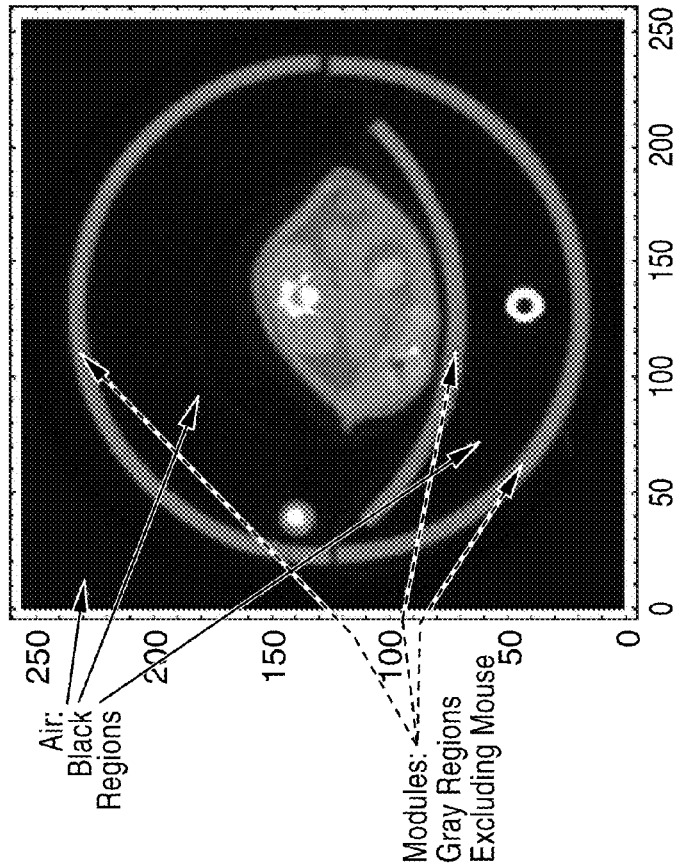
FIG. 5A and FIG. 5B depict surrounding modules and air regions that can be utilized as surrounding information constraints using a representative reconstruction of a mouse in a X-ray MicroCT scanner.
Figure 5A:
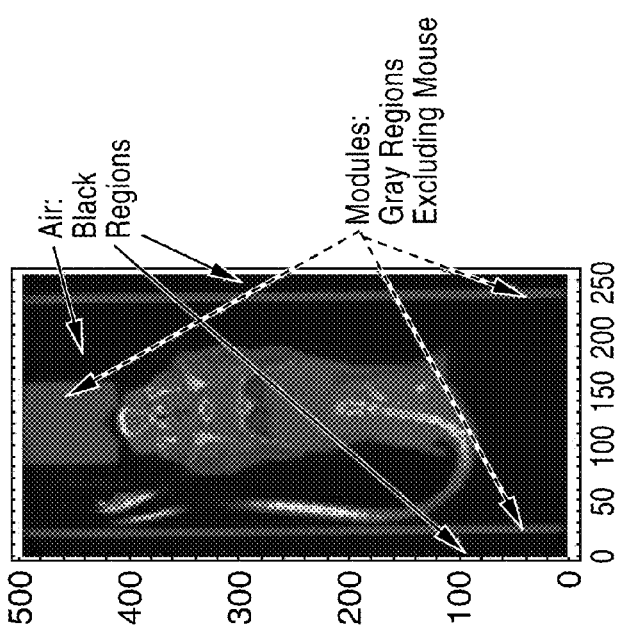

Referring now to FIG. 5A and FIG. 5B, a MicroCT scan of a mouse is used to demonstrate an embodiment of the present invention. FIG. 5A and FIG. 5B depict a reconstruction of a mouse in a MicroCT scanner through conventional methods. The image depicted in FIG. 5A is a coronal view of the reconstruction and the image depicted in FIG. 5B is one transaxial slice of a typical reconstruction of the same mouse. In these scans, the mouse was placed in a cylindrical casing 40 on a platform 42. The mouse is naturally surrounded by air 44 which is visualized by the black regions in the images.

Conventional methods reconstruct all objects in the field of view, such as the casing and air of the scanner, each time a scan is performed. Since the number of projections and dose is related to the number of voxels being solved for, a large number of projections (and hence dose) is needed to reconstruct all objects in the scanner. In contrast, the present invention utilizes information that can be attained from the surroundings of the objects to reduce the number of unknowns and hence reduce the number of projections, dose, scan time, as well as increase the image quality.

In one embodiment of this invention, the regions of the mouse's surroundings corresponding to the air and modules are first designated. The designation can be done by an algorithm through thresholding methods, manually by the user, or through a combination of such methods. In one embodiment, the region corresponding to the mouse is specified by the user, then by knowing the approximate attenuation coefficient of the air and casing, the regions corresponding to the air 44 and casing 40 is found by an algorithm that uses a find function to locate voxels that have voxel values in a given range. Once the voxels corresponding to the air 44 and casing 40 are located and stored, the expected attenuation coefficient of the air and modules can be determined by several methods.

One such method includes the use of theoretical calculations or simulation, such as using a table of attenuation values corresponding to the scan energy, to determine the expected voxel values of the surroundings. Another method of the present invention includes performing a set of scans without the mouse present in the scanner to form lookup tables corresponding to voxel values of the surroundings for the specific scan configurations. This method is preferred as it provides an accurate map of non-homogenous modules. These expected values are then used by an iterative algorithm to solve the image reconstruction problem by pushing the voxel values in the mouse's surroundings to their expected values. This process is detailed in Block 20 of FIG. 1.

As illustrated previously, many iterative algorithms can be used to solve for the reconstructed image. In one embodiment, during each iteration, the voxels in the designated surrounding regions are pushed towards their expected values by simply replacing the value of the voxel from the given iteration by its expected value if they vary from the expected value by a certain designated percentage. Such a procedure produces a final reconstructed image that is both consistent with the surrounding information and the acquired projection data. The method reduces the number of unknowns by replacing the surrounding voxel with values that can be accurately determined without imparting radiation dose to the object (for example, by acquiring a highly sampled scan without the object present in the scanner).

As a result, the same number of projections as conventional methods can be used to produce more accurate reconstructions with higher image quality parameters as resolution, contrast, and or signal to noise ratio. Alternatively, the number of projections acquired can be reduced to lower the dose. Since the method in general produces more accurate reconstructions, it has been shown experimentally that a reconstruction of a given quality can be produced with a reduced number of projections. Consequently, a reconstruction of a given quality can be produced with a lower dose to the mouse.

In addition, since in several modalities including that of the current example, the scan acquisition time is proportional to the number of projections, the acquisition time is reduced since fewer projections are acquired. One application of this method is in high speed imaging of objects in motion such as the heart where it is critical to acquire the scan in the least amount of time in order to reduce motion artifacts. Furthermore, since higher signal to noise ratios can be produced by this method, it is possible to lower the dose by decreasing the radiation flux of each projection.

This method has been tested with computer simulations and preliminary experiments using a MicroCT scanner.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. In any appended claims, reference to an element in the singular is not intended to mean "one and only one" unless explicitly so stated, but rather "one or more." All structural, chemical, and functional equivalents to the elements of the above-described preferred embodiments that are known to those of ordinary skill in the art are expressly incorporated herein by reference and are intended to be encompassed by the present disclosure. Moreover, it is not necessary for a device or method to address each and every problem sought to be solved by the present invention, for it to be encompassed by the present disclosure. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An image reconstruction method, comprising:
creating a scanner profile of a scanner with a scanner imaging field;
determining expected voxel values of said imaging field;
scanning a specimen with said scanner; and
reconstructing an image of the specimen from the scan utilizing said scanner profile and the expected voxel values of the imaging field and any objects of interest within the imaging field surrounding said specimen in the reconstruction process.

2. A method as recited in claim 1, further comprising:
performing a set of reference scans and storing the corresponding reconstructions without the subject in the scanner using scanner settings that result in the same approximate source spectrum shape that is normalized to be independent of fluence as used with said patient scan; and
using said set of reference scans and said scanner profile to determine said expected voxel values of said imaging field.

3. A method as recited in claim 2, wherein said set of reference scans are performed at higher quality using a higher number of projections and fluence than the corresponding scans with a subject in the scanner.

4. A method as recited in claim 1, wherein the expected voxel values of the imaging field and any objects of interest within the imaging field are assigned based on theoretical and physical data.

5. A method as recited in claim 1, further comprising:
performing a set of reference scans without the patient in the scanner for a plurality of scan parameters and scanner configurations to produce a reference data set with the approximate voxel values for each type of scan and scanner configuration;
storing the reference data set from the corresponding reconstructions;
determining the locations and nature of the surroundings of said scanned subject by an initial reconstruction of a first subject scan;
designating a set of voxels as constraints; and
determining expected values of the designated voxels from the reference scans.

6. A method as recited in claim 5, further comprising:
reducing the number of said subject scans, scan times and fluence of each of the subject scans.

7. A method as recited in claim 1, wherein said reconstruction of an image of the subject further comprises an iterative reconstruction comprising:
mathematically transforming the acquired voxel values of the image field surrounding a subject of said subject scanned so that the majority of the voxel values after said transformation are numerically closer to the said assigned expected voxel values.

8. A method as recited in claim 7, wherein said mathematical transformation for a given voxel location comprises the weighted sum of the terms as defined by a scalar multiplied by the assigned expected voxel value plus another scalar multiplied by the current voxel value plus another scalar multiplied by the previous voxel value plus other scalars multiplied by other past voxel values when the voxel value at the given iteration stage differs from the expected voxel value by a certain user defined percentage.

9. A method as recited in claim 7, wherein said iterative reconstruction comprises an iterative reconstructive algorithm selected from the group of algorithms consisting essentially of algebraic reconstruction techniques (ART), expectation maximization (EM), maximum a posteriori (MAP), Maximum Likelihood-Expectation Maximization (ML-EM), iterative filtered back projection, iterative forward- and back-projection, equally sloped tomography and direct iterative Fourier method.

10. An image reconstruction method, comprising:
creating a scanner profile of a scanner with a scanner imaging field;
utilizing anatomical information of a subject containing a radiation source to locate the boundaries of a subject placed within said imaging field;
determining the locations of voxels surrounding the boundaries of said subject and the location any known radioactive source within said subject;
assigning to those surrounding locations appropriate expected voxel values;
scanning said subject with a plurality of scans; and
reconstructing an image of the subject from the scan utilizing said supplemental scanner profile and anatomical information about the locations and assigned expected voxel values in the reconstruction process.

11. A method as recited in claim 10, wherein said anatomical information is obtained from a different imaging modality than said scanner.

12. A method as recited in claim 11, wherein said imaging modality is selected from the group of modalities consisting essentially of optical, infrared, radiofrequency, laser, magnetic resonance, emission, and transmission imaging or physical measurement to locate the boundaries of a subject.

13. A method as recited in claim 10, wherein said voxel values of said surroundings are assigned an expected value corresponding to zero activity.

14. A method as recited in claim 10, further comprising:
performing a set of reference scans and storing the corresponding reconstructions without the subject in the scanner using scanner settings that result in the same approximate source spectrum shape that is normalized to be independent of fluence as used with said patient scan; and
using said set of reference scans and said scanner profile to determine said expected voxel values of said imaging field.

15. A method as recited in claim 14, wherein said set of reference scans are performed at higher quality using a higher number of projections and fluence than the corresponding scans with a subject in the scanner.

16. A method as recited in claim 10, further comprising:
performing a set of reference scans without the patient in the scanner for a plurality of scan parameters and scanner configurations to produce a reference data set with the approximate voxel values for each type of scan and scanner configuration;
storing the reference data set from the corresponding reconstructions;
determining the locations and nature of the surroundings of said scanned subject by an initial reconstruction of a first subject scan;
designating a set of voxels as constraints; and
determining expected values of the designated voxels from the reference scans.

17. A method as recited in claim 10, wherein said reconstruction of an image of the subject further comprises an iterative reconstruction comprising:
mathematically transforming the acquired voxel values of the image field surrounding a subject of said subject scanned so that the majority of the voxel values after said transformation are numerically closer to the said assigned expected voxel values.

18. A method for reconstruction of an image from its projections, comprising:
performing a set of reference scans of a scanner without the patient in the scanner for a plurality of scan parameters and scanner configurations to produce a reference data set with the approximate voxel values for each type of scan and scanner configuration;
determining locations of the objects of interest surrounding a patient within a scanner imaging field;
determining expected voxel values of the objects of interest;
storing the reference data set from the corresponding reconstructions;
scanning a patient with a scanner; and
reconstructing an image of the patient from the scan utilizing supplemental information about the locations and expected voxel values of the objects of interest in the reconstruction of said patient scans.

19. A method as recited in claim 18, further comprising:
utilizing anatomical information of a patient to locate the boundaries of a subject placed within said imaging field.

20. A method as recited in claim 19, wherein said anatomical information is obtained by co-registering an image from an imaging system that is different from said scanner.

* * * * *